H. E. GALLAGHER.
SECTIONAL MOLDED WOOD ROOF GUTTER.
APPLICATION FILED APR. 3, 1911.
1,036,090.
Patented Aug. 20, 1912.
2 SHEETS—SHEET 1.
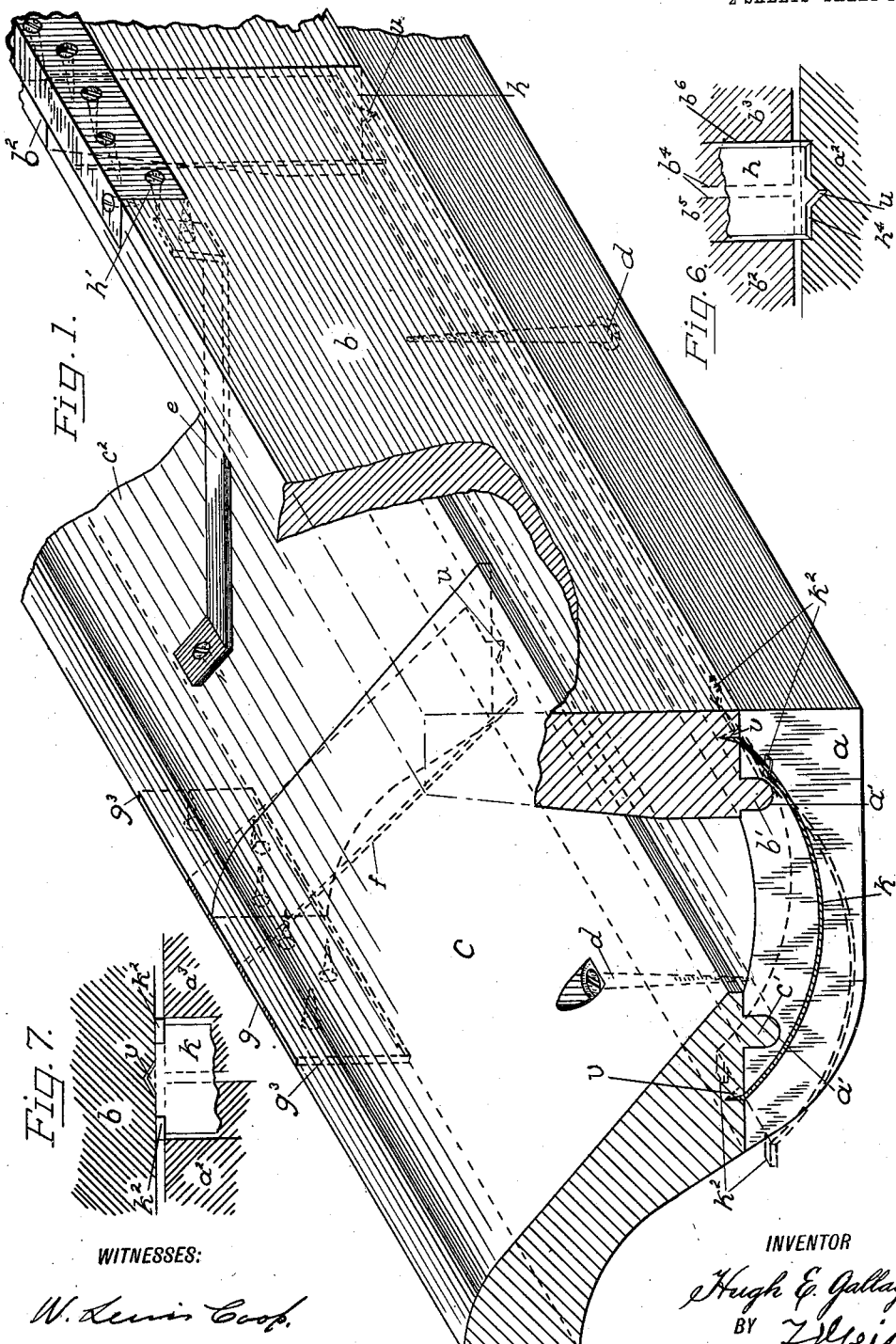
WITNESSES:
INVENTOR
Hugh E. Gallagher.
BY
ATTORNEY H. E. GALLAGHER.
SECTIONAL MOLDED WOOD ROOF GUTTER.
APPLICATION FILED APR. 3, 1911.
1,036,090.
Patented Aug. 20, 1912.
2 SHEETS—SHEET 2.
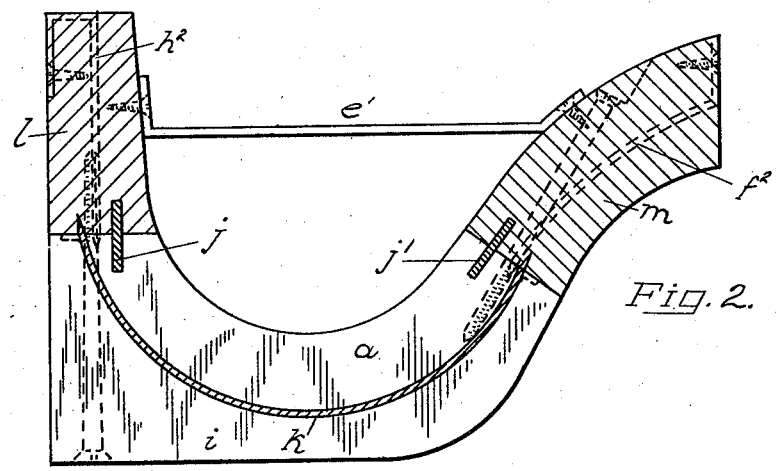
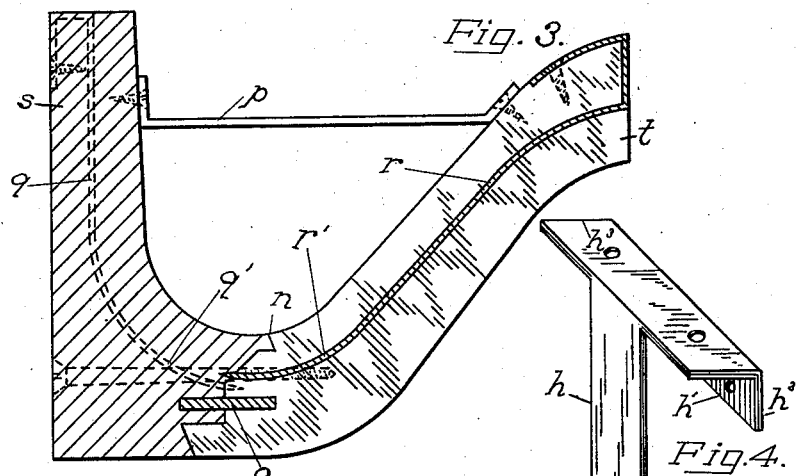
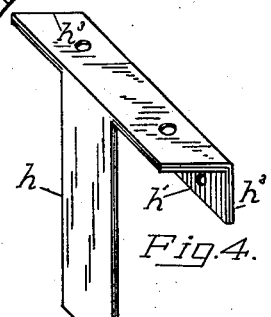
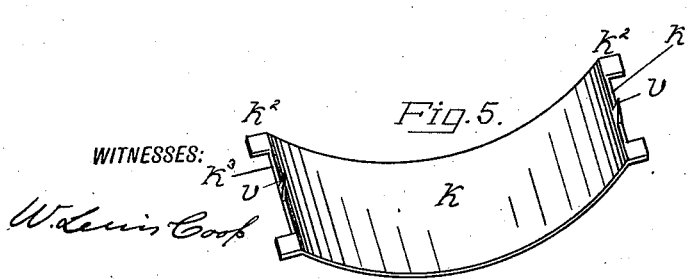
WITNESSES:
INVENTOR
Hugh E. Gallagher.
BY
ATTORNEY

UNITED STATES PATENT OFFICE.

HUGH E. GALLAGHER, OF PORTLAND, OREGON.

SECTIONAL MOLDED WOOD ROOF-GUTTER.

1,036,090.  Specification of Letters Patent.  Patented Aug. 20, 1912.

Application filed April 3, 1911. Serial No. 618,765.

*To all whom it may concern:*

Be it known that I, HUGH E. GALLAGHER, a citizen of the United States, and a resident of Portland, county of Multnomah, and State of Oregon, have invented a new and useful Improvement in Sectional Molded Wood Roof-Gutters, of which the following is a specification.

The object of my invention is to provide a sectional gutter built from a plurality of parts, each part made of a comparatively short and narrow piece of wood. I also prefer to cut the pieces out of what is known as vertical grain material, so as to bring the grain nearly perpendicular to the exposed face of the respective pieces, thereby preventing danger of "checking," which frequently occurs on one face or the other when the gutter is made of a solid piece of wood.

My invention also has for its object to use small pieces of wood which may be machined into shape without great waste, and yet build the parts so obtained into a gutter having a large water space, and embodying comparatively little material for the size of the gutter; also to so construct the parts of my gutter that the sections thereof may be thoroughly and rapidly dried, being very thin, in a kiln.

Another object is to make the longitudinal joints between the pieces or sections water-tight, and to reinforce them by a series of interlocking tongues and grooves. The transverse joints between the abutting sections are also reinforced and made water-tight by suitable tongue-like metal strips embedded in the abutting sections.

Finally it is my purpose to obtain a gutter which is very durable and also of neat appearance in general.

These features and others embodied in my invention are hereinafter fully described.

In the drawings: Figure 1 is a projection of my gutter as constructed when composed of my gutter as constructed when composed of three parts, and illustrating how the longitudinal joints of the parts are made water-tight by means of interlocking tongues; also showing my method of joining the abutting ends of the sections with metal tongues; Fig. 2 is a cross section of another mode of constructing a three-part gutter, and more particularly illustrates the use of metal tongues or splines for making the longitudinal joints water-tight; Fig. 3 is a cross-section of a two-part gutter formed with molded faces at the joint for the purpose of aiding the metal splines or tongues in making a water-tight joint; Fig. 4 is a detail of the metal joint plates used for joining the abutting ends of the straight side of the gutter sections; Fig. 5 shows one of the metal joint plates used for uniting the abutting ends of the bottom parts of the gutter sections; and Figs. 6 and 7 are diagrammatic sections, illustrating the means employed for obtaining a water-tight joint at the crevices between the abutting ends of two side sections overlying a bottom section, and vice versa, at the crevice between the abutting ends of two bottom sections underlying a side section.

The bottom part, $a$, in Fig. 1 is made with grooves, $a'$, $a'$ to receive the tongues, $b'$, $c'$, on the side-parts $b$, $c$. The side-parts are fastened to the bottom parts by a series of wood screws $d$ placed at uniform distances along the entire length of the gutter. To further strengthen the structure, a series of transverse metal braces, $e$, are mounted inside the trough of the gutter. The abutting ends of the sides of the gutter are joined together by means of joint-plates. The near corner of the straight side-part $b$ is broken away to show that the abutting ends of the curved side-parts, $c$, $c^2$, are joined by a metal joint-plate $f$. In order to obtain rigidity at the joint so formed, the plate $f$ is made with an angular integral member $g$. The metal joint-plate $h$ provides a water-tight joint between the abutting ends of the straight side-sections, $b$, and the rigidity of the latter is maintained by the angular member $h'$, integral on the plate $h$. The abutting ends of the sections of the bottom part, $a$, are held together by a plate $k$, a detail of which is shown in Fig. 5; said plate $k$ being curved relatively to the bottom piece $a$, as shown. The transverse joints of all the parts are staggered throughout the assembled parts.

In place of the tongues and grooves used in Fig. 1, metal tongues or splines, as $j$, $j'$, shown in Fig. 2, may be used to join the parts, $i$, $l$, $m$, and render them water-tight along their longitudinal joints; said metal tongues being inserted in kerfs therefor provided in the abutting faces of the parts. The parts $i$, $l$, $m$, as apparent, are the equivalents of the described parts $a$, $b$, $c$; and the joint plates, $f^2$, $h^2$, are the equivalents of $f$ and $h$ in Fig. 1. The sections of this gutter, in short, are joined together substantially in the same manner as shown in Fig. 1. This gutter is braced by rods as $e'$.

In Fig. 3 the abutting faces forming the longitudinal joints, $n$, of the sides, $s$, $t$, are so shaped as to interlock, in order to aid the work of the metal tongues $o$, in rendering the joint water-tight. The joint-plates, $q$, $r$, are made substantially like the plates $f$, $h$, and $f^2$, $h^2$, shown in Figs. 1 and 2, except that the lower ends $q'$, $r'$ are formed to conform with the shapes of the sides $s$, $t$. This gutter is braced by rods like $p$ in the same manner as in Fig. 1.

As obvious, all the joint-plates and tongues constitute reinforcing means, giving rigidity and strength to the parts at the joints. To augment this feature, all the joint plates are made in the form of angle irons, $f$, $h$, and their equivalents are preferably formed with extensions as $g^3$, $g^3$, and $h^3$, $h^3$ (see detail Fig. 4) so as to provide for longitudinal rigidity.

In Fig. 6 are shown the means employed for obtaining a water-tight joint between the abutting end faces of the two side-sections represented by $b^2$, $b^3$, and an underlying bottom section represented by $a^2$. As already described, these parts are connected by means of a tongue plate like $h$. The abutting faces of the side-sections, $b^2$, $b^3$, are represented by the parallel lines $b^4$, said abutting ends being made with kerfs in which to insert the tongues; said kerfs being represented by the lines $b^5$, $b^6$. The bottom edge $h^4$ of the tongue $h$ is made sharp, so that when the side-sections are forced down upon the supporting face of the bottom section, said sharp edge $h^4$ will slightly penetrate, and in so doing contribute toward forming a water-tight joint. The bottom edge $h^4$ is further preferably made with a centrally located tongue $u$, so as to bring about a deeper penetration of the bottom edge of the joint plate $h$ directly under the abutting faces $b^4$, also to insure a water-tight joint.

The sharp points, $v$, $v$, shown as formed centrally in the ends of the tongue $k$ (compare Figs. 1 and 5) serve the same purpose as the tongues $u$. The edges $k^3$ of the tongues $k$ need not be made sharp. The tongues $k$ are inserted in kerfs therefor cut in the abutting ends of two bottom sections. Said ends $k^3$ are made with lugs, $k^2$, which, when the parts are assembled, as illustrated in Fig. 1, will lie between the opposed faces of the bottom and side sections, and hold the tongues $k$ against slipping sidewise in the kerfs when the bottom sections are driven together. When the parts are assembled, the tongues $v$, $v$ will be in registration with the crevices between the abutting end-faces of two bottom sections, and will form a water-tight joint for such crevice, as diagrammatically illustrated in Fig. 7.

I claim:

1. In a device comprising abutting bottom and side sections, tongue and groove-like means for joining the sections along their abutting faces, the abutting ends of the sections being made with kerfs, the parts of the sections being arranged so as to stagger the joints formed by the abutting ends of the side sections with respect to those of the bottom section, so as to bring a joint opposite a solid piece, a joint plate inserted in said kerfs, the extremity of said joint plate driven into the face of the solid piece so that the crevice in the abutting end faces of the members of a joint is blocked by said joint plate at the juncture of said joint with the said solid piece.

2. In a sectional molded wood gutter, a plurality of abutting bottom and side sections; tongue and groove-like means for joining the side and bottom sections along their longitudinal abutting faces, the abutting ends of the sections being made with kerfs; joint plates inserted in said kerfs; the kerfs of the ends of the bottom sections and the joint plates therein inserted being curved substantially concentric with the inner face of the bottom of the gutter; and the joint plates of the bottom sections being formed on their ends with lugs adapted to lie between the opposed faces of the bottom and side sections and serving to hold said joint plates against lateral displacement while the bottom sections are driven together endwise.

3. In a sectional molded wood gutter, a plurality of abutting bottom and side sections; tongue and groove-like means for joining the side and bottom sections along their longitudinal abutting faces, the abutting ends of the sections being made with kerfs; joint plates inserted in said kerfs; and said joint plates being made with an integral pointed lug at the inner extremity, and said lug being adapted and located to block the crevice between the abutting end-faces of the bottom and side sections at the juncture with the upper faces of the bottom sections.

4. In a sectional molded wood gutter, a plurality of abutting bottom and side sections; tongue and groove-like means for joining the side and bottom sections along their longitudinal abutting faces, the abutting ends of the sections being made with kerfs; joint plates inserted in said kerfs; the joint plates of the kerfs for the side sections being formed at their upper ends with channel-like portions embracing the exterior portion of the top of the sides; and said joint plates being made with an integral pointed lug at the inner extremity, and said lug being adapted and located to block the crevice between the abutting end-faces of the bottom and side sections at the juncture with the upper faces of the bottom sections.

5. In a sectional molded wood gutter, a plurality of abutting bottom and side sections; tongue and groove-like means for joining the side and bottom sections along their longitudinal abutting faces, the abutting ends of the sections being made with kerfs; joint plates inserted in said kerfs; the joint plates of the kerfs for the side sections being formed at their upper ends with channel-like portions embracing the exterior portion of the top of the sides; the outer member of said channel-like portions formed with lateral extensions; and said joint plates being made with an integral pointed lug at the inner extremity, and said lug being adapted and located to block the crevice between the abutting end-faces of the bottom and side sections at the juncture with the upper faces of the bottom sections.

6. In a sectional molded wood gutter, a plurality of abutting bottom and side sections; tongue and groove-like means for joining the side and bottom sections along their longitudinal abutting faces, the abutting ends of the sections being made with kerfs; joint plates inserted in said kerfs; the joint plates of the kerfs for the side sections being formed at their upper ends with channel-like portions embracing the exterior portion of the top of the sides; the outer member of said channel-like portions formed with lateral extensions; the kerfs of the ends of the bottom sections and the joint plates therein inserted being curved substantially concentric with the inner face of the bottom of the gutter; said joint plates being made with an integral pointed lug at the inner extremity, and said lug being adapted and located to block the crevices between the abutting end-faces of the bottom and side sections at the juncture with the upper faces of the bottom sections; and the joint plates of the bottom sections being formed on their ends with lugs adapted to lie between the opposed faces of the bottom and side sections and serving to hold said joint plates against lateral displacement while the bottom sections are driven together endwise.

7. In a sectional molded wood gutter, a plurality of abutting bottom and side sections made of wood with the grain substantially perpendicular to the faces exposed at the interior of the gutter; tongue and groove-like means for joining the side and bottom sections along their longitudinal abutting faces, the abutting ends of the sections being made with kerfs; joint plates inserted in said kerfs; the joint plates of the kerfs for the side sections being formed at their upper ends with channel-like portions embracing the exterior portion of the top of the sides; the outer member of said channel-like portions formed with lateral extensions; the kerfs of the ends of the bottom sections and the joint plates therein inserted being curved substantially concentric with the inner face of the bottom of the gutter; said joint plates being made with an integral pointed lug at the inner extremity, and said lug being adapted and located to block the crevices between the abutting end-faces of the bottom and side sections at the juncture with the upper faces of the bottom sections; and the joint plates of the bottom sections being formed on their ends with lugs adapted to lie between the opposed faces of the bottom and side sections and serving to hold said joint plates against lateral displacement while the bottom sections are driven together endwise.

HUGH E. GALLAGHER.

Witnesses:
  CECIL LONG,
  W. LEWIS COOP.

---

Copies of this patent may be obtained for five cents each, by addressing the "Commissioner of Patents, Washington, D. C."